United States Patent Office 3,816,606
Patented June 11, 1974

3,816,606
METHOD FOR PREPARING NON-SOLVATED ALUMINUM HYDRIDE
Theodore C. Kraus, Cheshire, Conn., assignor to Olin Mathieson Chemical Corporation
No Drawing. Filed Oct. 23, 1962, Ser. No. 234,576
Int. Cl. C01b 6/00
U.S. Cl. 423—645                          6 Claims

ABSTRACT OF THE DISCLOSURE

Non-solvated aluminum hydride is prepared by reacting sodium aluminum hydride with aluminum chloride in the presence of a minor amount of lithium aluminum hydride in a dialkyl ether solution. The resulting solvated aluminum hydride is then heated to give non-solvated aluminum hydride.

This invention relates to the preparation of non-solvated aluminum hydride.

Aluminum hydride is useful as a reducing agent, as a fuel for solid propellants, and as an intermediate. The non-solvated aluminum hydride of this invention when incorporated with oxidizers is capable of being formed into a wide variety of grains, tablets and shapes all with desirable mechanical and chemical properties. Propellants produced by the methods described in this application burn uniformly without disintegration when ignited by conventional means, such as a pyrotechnic type igniter, and are mechanically strong enough to withstand ordinary handling.

Although a great number of attempts have been made to prepare non-solvated aluminum hydride, the end result has been the formation of either an impure polymeric product or a solid, solvated polymer from which the removal of all the solvent without decomposition could not be achieved. Finholt et al. (JACS 69, 1199–1203 (1947)) reacted lithium aluminum hydride with aluminum chloride in the presence of diethyl ether and obtained a solid with a variable composition. Although the ratio of hydrogen to aluminum in the solid was 3:1 within experimental error, the total weight of the aluminum and the hydrogen in the solid product was always less than the total weight of the sample, the difference being the weight of the diethyl ether in the solvated compound.

In the method of this invention sodium aluminum hydride is reacted with aluminum chloride in the presence of a minor amount of lithium aluminum hydride to yield aluminum hydride and sodium chloride. The reaction, which is accomplished in the presence of a lower dialkyl ether, takes place according to the following equation:

$$3NaAlH_4 + AlCl_3 \xrightarrow{LiAlH_4} 4AlH_3 + 3NaCl$$

In carrying out the process of this invention the aluminum chloride dissolved in the lower dialkyl ether, for example, is added dropwise to a slurry of the sodium aluminum hydride and a minor amount of lithium aluminum hydride in a lower dialkyl ether. At the conclusion of the reaction the ether-insoluble solids formed in the reaction and those unreactive materials remaining are removed from the reaction mixture by filtration. The resulting filtrate solution containing the aluminum hydride product and lithium aluminum hydride is then subjected to reduce pressure in order to strip off the ether and the residue formed is further dried under high vacuum yielding a solid solvated aluminum hydride product. This dry, solid product contains the etherated or solvated aluminum hydride product together with the lithium aluminum hydride. Before proceeding with the desolvation step, it is preferred to grind the dry salt to a fine powder. The complete removal of the ether from the solvated product is accomplished by heating at a temperature ranging from ambient temperature to an elevated temperature from about 60° to about 150° C. Advantageously during the heating step a vacuum or a nitrogen sweep is employed to facilitate the removal of the ether. During the desolvation step the intermediate product is maintained at the elevated temperature for a sufficiently long period of time to insure quantitative elimination of the ether. Depending upon the technique employed this time will range from about 0.5 to about 20 hours or more. The product remaining after the heat treatment phase contains the aluminum hydride product in non-solvated form together with the lithium aluminum hydride which can then be extracted from the non-solvated product with a lower dialkyl ether. Following the ether wash, the product is dried again, preferably either under vacuum or with the aid of a nitrogen sweep, at room temperature or at a slightly higher temperature.

The temperature in which the reaction is conducted will generally be from about −25° C. to about +50° C. with the preferred temperature being from about −10° C. to about +32° C.

In carrying out the reaction any of the lower dialkyl ethers can be employed. Suitable lower dialkyl ethers include ethyl ether, methyl ether, n-propyl ether, n-butyl ether, n-amyl ether, methyl ethyl ether, methyl propyl ether, methyl butyl ether, ethyl propyl ether, ethyl butyl ether, propyl butyl ether, isopropyl ether, isobutyl ether, isoamyl ether, methyl isopropyl ether, methyl isobutyl ether, ethyl isobutyl ether, ethyl isopropyl ether, ethyl isobutyl ether, ethyl isoamyl ether, etc. In a like manner the lower dialkyl ethers mentioned above are suitable for the extraction of the lithium aluminum hydride from the crude product consisting of the lithium aluminum hydride and the non-solvated aluminum hydride product. Ethers boiling at less than 100° C. are preferred.

In carrying out the novel process of this invention stoichiometric quantities of the reactants are generally employed, that is, 3 moles of sodium aluminum hydride to each mole of aluminum chloride, although, if desired an excess of sodium aluminum hydride up to about 200 percent or more of the stoichiometric requirement can be utilized in order to drive the reaction to completion and to increase the reaction rate. The exact function of the lithium aluminum hydride in this reaction is not fully understood. It is known, however that when an attempt is made to react sodium aluminum hydride with aluminum chloride in a lower dialkyl ether with stirring that no aluminum hydride is formed even after a prolonged reaction period. The quantity of the lithium aluminum hydride employed in the novel process of this reaction can be varied widely from about 0.01 mole to about 0.25 mole per mole of sodium aluminum hydride charged to the reactor. Preferably from about 0.02 mole to about 0.10 mole of lithium aluminum hydride per mole of sodium aluminum hydride will be employed. The lithium aluminum hydride plays a dual role in the novel process of this invention in that it is also necessary in the desolvation step of the applicant's process. The presence of lithium aluminum hydride enables one to effect the complete removal of the lower dialkyl ether during the desolvation step. If desired, a part of the lithium aluminum hydride employed in the novel process of this invention can be added directly to reaction mixture at the conclusion of the reaction or it can be added at any stage of process up to the time the dry etherated or solvated product is recovered, for example, as a solution in a lower dialkyl ether to the filtrate obtained after the insoluble materials present in the reaction mixture at the conclusion of the reaction have been removed. Generally the quantity of lithium aluminum hydride added after the reaction has been completed will vary from a trace amount up to about 85 percent of the total amount of the lithium aluminum hydride utilized in the complete process.

The non-solvated aluminum hydride produced by practicing the method of this invention can be employed as an ingredient of solid propellant compositions in accordance with general procedures which are well understood in the art, inasmuch as the non-solvated aluminum hydride produced by practicing the present process is readily oxidized using conventional solid oxidizers, such as ammonium perchlorate, potassium perchlorate, sodium perchlorate, ammonium nitrate and the like. In formulating a solid propellant composition employing non-solvated aluminum hydride produced in accordance with the present invention, generally from 10 to 35 parts by weight of non-solvated aluminum hydride and from 65 to 90 parts by weight of oxidizer such as ammonium perchlorate, are present in the final propellant composition. In the propellant, the oxidizer and the non-solvated aluminum hydride of the present process are formulated in intimate admixture with each other, as by finally subdividing each of the materials separately and thereafter intimately admixing them. The purpose in doing this, as the art is aware, is to provide proper burning characteristics of the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided non-solvated aluminum hydride can be admixed with a high solids content solution of a partially condensed urea-formaldehyde or phenol-formaldehyde resin, the proportions being such that the amount of the resin is about 5 to about 10 percent by weight, based upon the weight of the oxidizer and the non-solvated aluminum hydride. The ingredients are thoroughly mixed with simultaneous removal of the solvent, and following this the solid-free mixture is molded into the desired shape as by extrusion. Thereafter, the resin can be cured by resorting to heating at moderate temperatures. For further information concerning the formulation of solid propellant compositions, reference is made to U.S. Pat. No. 2,622,277 to Bonnell et al.

The following examples will serve to further illustrate this invention:

EXAMPLE I

The apparatus utilized in this experiment was a two-liter, three-necked flask fitted with an addition funnel, a high speed stirrer, and a reflux condenser. Sodium aluminum hydride in the amount of 24 grams, and lithium aluminum hydride in the amount of 0.9 gram were slurried in 800 ml. of refluxing ether for one hour. To the refluxing ether solution there was added dropwise 19 grams of aluminum chloride dissolved in 160 ml. of diethyl ether. The addition rate was approximately 40 ml. per hour. The extent of the reaction as indicated by the consumption of the aluminum chloride was determined by making periodic titrations for chloride on 10 ml. aliquots removed from the reaction mixture. After the reaction had run to completion, the reaction mixture was filtered in order to remove the solids present. During the filtration which was accomplished in a dry box, a nitrogen atmosphere was maintained. The precipitate was washed with two 50 ml. portions of diethyl ether, the second of which contained 2.5 grams of lithium aluminum hydride. The filtrate and washings containing the aluminum hydride and lithium aluminum hydride were combined and stripped of ether under reduced pressure yielding a white residue which was further dried under high vacuum. The total weight of the product at this stage was 10.9 grams. In the next step, this residue was heated under high vacuum from room temperature to 75°–80° C. in one hour, maintained at 75–85° C. for one hour and then heated rapidly to 100° C. and finally maintained at 100° C. for approximately 40 min. The resulting desolvated aluminum hydride product was then slurried with 70 ml. of dry diethyl ether for 30 min. The slurry was filtered and the non-solvated aluminum hydride was washed with two 20 ml. portions of diethyl ether after which the washed, wet product was dried at room temperature under high vacuum yielding 4.2 grams of non-solvated aluminum hydride which represents a 25 percent yield based on the theoretical quantity.

The product was analyzed for aluminum, hydrogen, carbon, chlorine and lithium and the following results were obtained:

|  | Al | H | C | Li | Cl |
|---|---|---|---|---|---|
| Calc'd for $AlH_3$ | 89.92 | 10.08 |  |  |  |
| Found | 83.1 | 9.3 | 0.3 | 0.7 | 0.7 |

EXAMPLE II

The same apparatus utilized in Example I was used in carrying out this experiment. For this example 24 grams of sodium aluminum hydride and 1.0 gram of lithium aluminum hydride were slurried in 1000 ml. of refluxing diethyl ether for about 1 hour. Then 19 grams of aluminum chloride dissolved in 140 ml. of diethyl ether was added dropwise (at a rate of approximately 40 ml. per hour) to the refluxing ether slurry. The extent of the reaction as indicated by the consumption of aluminum chloride was determined by periodic titrations for chloride on 10 ml. aliquots removed from the reaction mixture. At the conclusion of the reaction, an additional amount of lithium aluminum hydride (3.0 grams) was added to the reaction mixture. After the reaction mixture had been filtered to remove solids present and after the solids had been washed in the manner described in Example I with the exception that none of the washes contained lithium aluminum hydride the resulting filtrate and washings which contained the aluminum hydride product and lithium aluminum hydride were stripped of diethyl ether under reduced pressure and finally the residue was subjected to high vacuum at room temperature for 13 hours. The product was removed from the flask, ground to a fine powder, and subjected to further treatment under high vacuum for one hour at room temperature. The resulting white, solid product which consisted of the aluminum hydride formed during the reaction together with associated diethyl ether and lithium aluminum hydride was then heated from room temperature to 60° C. in 30 minutes, maintained at 60° C. for 1 hour, and then further heated from 60° C. to 100° C. over 45 min. period. The final temperature of 100° C. was maintained for 20 min. The weight of the white product non-solvated aluminum hydride containing lithium hydride resulting was 18.0 grams. In the next step, the solid obtained was stirred with 180 ml. of diethyl ether for 45 min. and then filtered to recover the solid product. Next the solid product was washed with two 45 ml. portions of diethyl ether after which the wet product was dried under high vacuum for 18 hours yielding 13.4 grams of aluminum hydride which represents an overall yield of 78.7 percent based on the theoretical quantity.

The aluminum hydride product was analyzed for aluminum, hydrogen, carbon, and chlorine and the following results were obtained:

|  | Al | H | C | Cl |
|---|---|---|---|---|
| Calc'd for $AlH_3$ | 89.9 | 10.08 |  |  |
| Found | 85.5 | 9.8 | 1.7 | 0.7 |

EXAMPLE III

The same apparatus used in Examples I and II was used in performing this experiment. Twenty-four grams of sodium aluminum hydride (95 percent purity) and 3.5 grams of lithium aluminum hydride were slurried in 1 liter of refluxing diethyl ether for 1 hour. Then 18.8 grams of aluminum chloride dissolved in 150 ml. of diethyl ether was added dropwise with stirring (at a rate of approximately 40 ml. per hour) to the refluxing ether slurry. The extent of reaction as indicated by the consumption of aluminum chloride was determined by periodic titrations for chloride on 10 ml. aliquots removed from the reaction mixture. Stirring and refluxing of the mixture were continued for an additional 75 minutes after the last aluminum chloride ether addition. The solids were filtered and then washed with ether. The resulting filtrate and washings containing solvated aluminum hydride and lithium aluminum hydride were stripped of diethyl ether under reduced pressure and finally the residue was subjected to high vacuum at ambient temperature for 41 hours. The product was removed from the flask, ground to a fine powder, and subjected to additional heat treatment under high vacuum as follows: room temperature to 60° C. in 30 minutes, at 60° C. for 90 minutes, and from 60° C. to 90° C. for 1 hour at which time heating was terminated. The weight of product at this stage was 17.7 g. The final washing of the product was accomplished with 180 ml. of diethyl ether after which the wet product was dried under high vacuum for 65 hours. The yield of non-solvated aluminum hydride was 13.8 grams, which represents an overall yield of 82.1 percent based on the theoretical quantity. An X-ray analysis indicated that 87 percent of this product consisted of non-solvated aluminum hydride.

What is claimed is:

1. A method for the preparation of non-solvated aluminum hydride which comprises: (A) reacting sodium aluminum hydride with aluminum chloride in the presence of a minor amount of lithium aluminum hydride and in the presence of a lower-dialkyl ether, (B) separating solid and liquid phases of the resulting reaction mixture, (C) recovering from the resulting liquid phase a solvated aluminum hydride product containing lithium aluminum hydride, (D) heating the said solvated aluminum hydride product at a temperature of from about 20° C. to about 150° C. and for a period of time sufficient to remove the lower dialkyl ether associated with the aluminum hydride whereby a non-solvated aluminum hydride product containing lithium aluminum hydride is obtained and (E) recovering the non-solvated aluminum hydride.

2. The method of claim 1 wherein the reaction is carried out at a temperature within the range of from about −25° C. to about +50° C.

3. The method of claim 1 wherein the lower dialkyl ether is diethyl ether utilized in the process.

4. The method of claim 1 wherein an additional quantity of lithium aluminum hydride is added to the reaction mixture at the conclusion of the reaction, said quantity being up to about 85 percent by weight of the total quantity of lithium aluminum hydride employed in the process.

5. The method of claim 4 wherein the said additional quantity of lithium aluminum hydride is added as a solution of the said hydride in a lower dialkyl ether.

6. The method for the preparation of non-solvated aluminum hydride which comprises: (A) reacting sodium aluminum hydride with aluminum chloride in the presence of a minor amount of lithium aluminum hydride and in the presence of diethyl ether, (B) separating solid and liquid phases of the resulting reaction mixture, (C) recovering from the resulting liquid phase a solvated aluminum hydride product containing lithium aluminum hydride, (D) heating the said solvated aluminum hydride product at a temperature of from about 20° C. to about 150° C. and for a period of time sufficient to remove the diethyl ether associated with the aluminum hydride whereby a non-solvated aluminum hydride product containing lithium aluminum hydride is obtained and (E) recovering the non-solvated aluminum hydride.

References Cited

UNITED STATES PATENTS 2,920,935    1/1960    Finholt _____ 23–14

CARL D. QUARFORTH, Primary Examiner

R. L. TATE, Assistant Examiner